United States Patent [19]

Mahoney

[11] 4,163,828

[45] Aug. 7, 1979

[54] PARYLENE STABILIZATION

[75] Inventor: Dennis M. Mahoney, Long Valley, N.J.

[73] Assignee: Union Carbide Corporation, New York, N.Y.

[21] Appl. No.: 871,145

[22] Filed: Jan. 20, 1978

[51] Int. Cl.² .............................................. B32B 9/04
[52] U.S. Cl. .................................................. 428/411
[58] Field of Search .................. 427/248 H; 428/500, 428/411

[56] References Cited

U.S. PATENT DOCUMENTS

| | | | |
|---|---|---|---|
| 3,246,627 | 4/1966 | Loeb et al. | 427/255 X |
| 3,301,707 | 1/1967 | Loeb et al. | 427/101 X |
| 3,600,216 | 8/1971 | Stewart | 427/387 X |

*Primary Examiner*—Bernard D. Pianalto

*Attorney, Agent, or Firm*—Saul R. Bresch

[57] ABSTRACT

A process for making an article comprising (a) a solid substrate and (b) a coating on said substrate, said coating comprising parylene admixed with (i) a sterically hindered phenol vaporizable at a temperature in the range of about 20° C. to about 150° C. or (ii) pyrogallol, said process comprising the following steps:

(A) vaporizing a substituted or unsubstituted p-xylylene diradical and said phenol or pyrogallol; and (B) introducing the vapors from step (A) into a deposition zone containing the substrate, said zone being under vacuum and at a temperature at which the vapors will condense, whereby the vapors condense on the substrate, the diradical polymerizing to parylene, coating the substrate and forming the article, and the defined article.

5 Claims, No Drawings

PARYLENE STABILIZATION

FIELD OF THE INVENTION

This invention relates to stabilized parylene compositions and a method for making same.

DESCRIPTION OF THE PRIOR ART

Parylene is a conformal coating used primarily in the electronics industry. It is unique as a coating because of its ability to provide ultra-thin films and conform to substrates of varied geometrical shapes and irregularities. Parylene also has excellent chemical resistance and can be used at relatively high temperatures. Another unusual characteristic of parylene is the method in which the coating is formed.

Parylene is a generic term applied to the family of unsubstituted and substituted poly-p-xylylenes. The polymers can be homopolymers or co-polymers depending on whether they are derived from one particular dimer or a mixture of different dimers. The unsubstituted homopolymer poly-p-xylylene has the structure

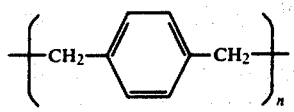

(hereinafter referred to as parylene N) and substituted homopolymers may be illustrated by the following structures:

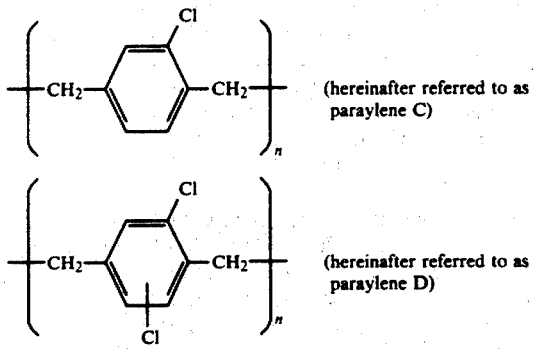

The substituent can be any organic or inorganic group, which can normally be substituted on aromatic nuclei. Examples of organic substituents are alkyl, aryl, alkenyl, cyano, carboxyl, alkoxy, hydroxy alkyl, and carbalkoxy and examples of inorganic substituents are hydroxyl, nitro, halogen, and amino. Generally, the substituent groups selected are functionally inert under process conditions. Of the substituents, the preferred groups are the lower alkyls having 1 to 10 carbon atoms such as methyl, ethyl, propyl, butyl, and hexyl; the lower aryl hydrocarbons having 1 to 2 benzene rings such as phenyl and napthyl and the alkylated phenyls and naphthyls having 1 to 10 carbon atoms in the alkyl moiety; and the halogens—chlorine, bromine, iodine, and fluorine.

A description of parylene, processes for making it, and the apparatus in which parylene deposition can be effected may be found in U.S. Pat. Nos. 3,246,627; 3,301,707; and 3,600,216, all of which patents are incorporated by reference herein. It will be observed, however, that the term "parylene" is not used in these patents. Instead, the term poly-p-xylylene is used generically and this term is considered to include both the unsubstituted and substituted varieties in the form of homopolymers or copolymers just as the term parylene in this specification.

The articles or parylene compositions of interest here are those in which the parylene is coated on or bonded to a substrate in the physical sense. The substrate may be plastic, metal, or ceramic and, more often than not, is a combination of two or all three. The plastic can be a thermoplastic or thermosetting organic compound, e.g., epoxy phenol-formaldehyde, or acrylate compounds. The metals are represented by aluminum, iron, steel, and molybdenum; and the ceramics are exemplified by glass and mixtures of various non-metallic and metallic oxides such as silicon oxide, aluminum oxide, titanium oxide, lead oxide, copper oxide, and iron oxide.

The process for coating a substrate with parylene is conventional. Typical steps and conditions of such a process involve first vaporizing a cyclic dimer which contains the desired repeating unit, e.g., cyclic di-p-xylylene, under a vacuum of about 10 to about 100 microns and at a temperature of about 150° C. to about 200° C.; then, pyrolyzing the vaporized cyclic dimer under the same or similar low pressure conditions at about 670° C. to about 690° C. The pyrolysis step breaks the benzylic carbon to carbon bonds to provide the p-xylylene monomer referred to as the p-xylylene diradical or just as the diradical, the diradical remaining in the vapor state; and, finally, introducing the vaporous diradical into a deposition chamber containing the heretofore described substrate, again under the same or similar vacuum, but at ambient temperatures in the range of about 20° C. to about 30° C., where the diradical condenses and polymerizes on all of the exposed surface of the substrate to provide a parylene film thickness of about 0.6 or 0.7 mil.

The function of the parylene coating in the electronics field is to passivate various devices and assemblies. In order to fulfill its function, the coating must retain its integrity, at least to the extent that it can carry out its passivation role over a period of time and under certain environmental constraints. Recognizing temperature as a prime environmental constraint, it is understandable that the electronics industry is concerned with the ∓thermal endurance" of the parylene coating, i.e., the maximum temperature at which a coating may be expected to serve or perform its intended function for a given time period or the maximum time a coating may be expected to serve at a given temperature.

It has been noted above that one of the unique characteristics of parylene is the temperature at which the coating can be used, but projections of temperatures at which it is expected that electronic devices having a need for parylene coatings will have to be used are constantly rising. At present, some microelectronic applications require thermal endurance in air at temperatures of 125° C. to 150° C. Semiconductor junctions are routinely operated at temperatures above 100° C. and the projected temperatures for power device use are at least 150° C. Still greater miniaturization of many electronic devices requiring passivating coatings also promises higher use temperatures, again, reaching upwards from 150° C. Further, the exposure of these devices to air during use adds to the thermal endurance requirements.

The upshot of the matter is that projected requirements for parylene coatings in electronic applications are that the coatings withstand temperatures of up to about 200° C. in air for periods of time as long as 10 years. Such a thermal endurance has heretofore not been achieved.

SUMMARY OF THE INVENTION

An object of this invention, therefore, is to provide a parylene coated article having a higher level of thermal endurance than has heretofore been achieved and a process for the production of such a parylene composition.

Other objects and advantages will become apparent hereinafter.

According to the present invention, such an article and process have been discovered, the article comprising (a) a solid substrate; and (b) a coating on said substrate, said coating comprising parylene admixed with (i) a sterically hindered phenol vaporizable at a temperature in the range of about 20° C. to about 150° C. or (ii) pyrogallol, and the process comprising the following steps:

(A) vaporizing a substituted or unsubstituted p-xylylene diradical and said phenol or pyrogallol; and (B) introducing the vapors from step (A) into a deposition zone containing the substrate, said zone being under vacuum and at a temperature at which the vapors will condense, whereby the vapors condense on the substrate, the diradical polymerizing to parylene, coating the substrate and forming the article.

DESCRIPTION OF THE PREFERRED EMBODIMENT

Parylene, the substrate, and the method for coating the substrate with parylene are well-known and have been described above. Various additives to the parylene coating are also conventional such as adhesion promotors, e.g., see U.S. Pat. No. 3,600,216 mentioned above.

Any sterically hindered phenol having at least one functional group, and preferably two or three or more functional groups, can be used here provided that the phenol is "vaporizable" at a temperature in the range of about 20° C. to about 150° C. The term "vaporizable" means that within the defined temperature range, the phenol will vaporize, but will essentially not degrade or dissociate. One can also use initially any compound which will yield such a vaporizable sterically hindered phenol with the application of heat. The compound will be such that, on being heated, it degrades or dissociates to provide the defined vaporizable, sterically hindered phenol. The heating may be accomplished in a vaporization zone just prior to the deposition zone or to the pyrolysis zone of the parylene deposition system depending on how high a temperature is required to effect the degradation. In addition to the mentioned phenol and phenol precursor, pyrogallol can be used. The hindered phenols and pyrogallol may be referred to herein as "phenols" or "phenol".

The amount of phenol which can be incorporated into the parylene is about 0.1 to about 15 percent by weight based on the weight of the parylene and is preferably about 0.4 percent to about 4 percent. Measurements of these amounts may be made by chlorine determination or oxygen neutron activation described hereinafter. The higher the in-use temperature, the higher the amount of phenol which will, preferably, be incorporated into the parylene. This higher amount will not only enhance the thermal endurance of the parylene, but will compensate for loss through volatilization or other means. While the additive can be incorporated into the parylene beyond its solubility limits, there is a practical limit as to the amount of phenol introduced and that is an amount which will degrade those physical properties of the parylene such as tensile strength, stiffness, and toughness.

It will be understood by those skilled in the art that the thermal endurance of any particular parylene will be enhanced by the addition of the phenol; however, among the various parylenes, the thermal endurance of one parylene may outshine that of another parylene, additive or no. It is found, for example, that the relative thermal endurance of the parylenes referred to above using the same phenol additive is as follows:

| | |
|---|---|
| parylene D + additive | greatest thermal endurance |
| parylene D − without additive | ↓ |
| parylene C + additive | ↓ |
| parylene N + additve | ↓ |
| parylene C − without additive | ↓ |
| parylene N − without additive | least thermal endurance |

Thus, the selection of a particular parylene for a particular application may be made on the basis of other characteristics with the knowledge that the addition of the phenols described herein will enhance its thermal endurance and most probably its tensile strength with which there is some correlation. In this same vein, selection of the substrate may affect performance of the parylene-phenol additive combination. For instance, where a copper substrate comes in contact with this combination, the effect on thermal endurance is deleterious. Fortunately, exposed copper, i.e., copper that would come in contact with parylene coating, is rarely encountered in electronic assemblies.

The phenol can be introduced anywhere in the parylene deposition system provided that it does not pass through a zone where the temperature is high enough to degrade or dissociate the compound. The temperature of degradation will have to be determined prior to the exposure of any compound to the dimer vaporization zone or the pyrolysis zone. If degradation is indicated, the compound will have to be vaporized after the pyrolysis zone and prior to the deposition zone. Where degradation is not a problem the only proviso is that the phenol is introduced into the deposition chamber in the vapor state together with the diradical for co-deposition on the substrate. The phenol precursor, of course, will be degraded, but care must be taken that the sterically hindered phenol derivative is also not degraded, i.e., that the defined sterically hindered phenol is introduced into the deposition chamber in the vapor state with essentially no degradation.

The diradical vapors and the phenol vapors apparently admix when brought together prior to or on their entrance into the deposition chamber. It is theorized that on condensation and polymerization of the diradical vapor on the substrate, the phenol or pyrogallol condense into micro reservoirs throughout the parylene film.

Two means of access are suggested for introducing the phenol or the pyrogallol into the parylene deposition system. The first is to premix the phenol, the phenol precursor, or the pyrogallol with the dimer and let the mixture pass through the vaporizing zone first, then the pyrolysis zone, and finally the deposition zone in the typical parylene deposition system. This is satisfactory provided that the phenol or the pyrogallol entering the deposition zone have not been previously degraded. The second means of access is to vaporize the phenol or pyrogallol and then introduce the vapor between the pyrolysis zone and the deposition zone through a leak valve. The latter means is preferred because phenol or pyrogallol introduced in this manner have shown improved activity for comparable concentrations over the same compounds introduced via admixture with dimer. Further, compounds so introduced by leak valve are distributed more uniformly due to check valve control on the amount incorporated during co-deposition.

To determine the concentration of the hindered phenol or pyrogallol in the parylene, the methods referred to above are used. In the chlorine determination technique, sample parylene films (having a halogen substituent) along with control films are analyzed for percent halogen (by weight) based on the weight of the parylene. The difference between the percent halogen in the control and the percent halogen in the sample will be the percent hindered phenol or pyrogallol in the film. In the neutron activation technique, oxygen in the film is bombarded by thermal neutrons and gives rise to a radioactive species of the same atomic number but one mass unit greater. By comparing the measured decay of a control film and subtracting from the sample film, a measure of oxygen concentration can be determined, which can be related to the phenol concentration. This latter technique appears to be superior to chlorine determination since there is no problem with impurity incorporation and a direct measurement of oxygen is used instead of subtracting large numbers.

The temperature at which step (A) is carried out depends on the temperatures at which the hindered phenol or pyrogallol will vaporize at the pressure under which step (A) is conducted. This, of course, depends on the vapor pressure of the particular compound. As noted, the compound i.e., the phenol or pyrogallol, may be vaporized together with the dimer and pass through the entire deposition system or may be vaporized in its own vaporization chamber and leaked in between the pyrolysis zone and the deposition zone. It is preferred to use the lowest temperature which will give the desired vaporization.

The vacuum used in the system and in step (B) is not perfect as a practical matter but is usually in the range of about 10 to about 100 microns preferably about 10 to about 40 microns.

The temperature in step (B) is simply the condensation temperature of the vapors. Generally, the temperatures used are in the range of about 20° C. to about 100° C., preferably about 20° C. to about 30° C. The various zones in the parylene deposition system are usually provided for in separate chambers, one for vaporization of the dimer (and the phenol or pyrogallol where this means is used for introducing these compounds); one for pyrolysis; one chamber for the vaporization of the phenol where these compounds are to be introduced by leak valve; and one chamber for deposition.

Examples of preferred sterically hindered phenols are 2, 6 dimethyl phenol; 2, 6 di-tert-butyl-4-methyl phenol; 2, 6-di-tert-butyl-4-n-butyl phenol. An example of a compound which yields a vaporizable sterically hindered phenol on heating, also preferred, is 1, 1, 3-tris (2-methyl-4-hydroxy-5-tert-butyl-phenyl) butane. Other sterically hindered phenols useful in the article and process may be represented by the following general structures:

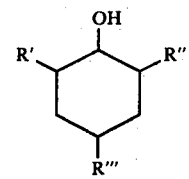

wherein
R' and R" are alike or different and are alkyl radicals having 1 to 5 carbon atoms. These radicals are preferably the same.
R''' is hydrogen or an akyl radical having 1 to 5 carbon atoms.
and

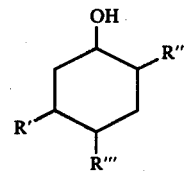

wherein:
R' and R" are alike or different and are alkyl radicals having 1 to 5 carbon atoms.
R''' is the same as R''' above.

Additional specific examples of vaporizable sterically hindered phenol compounds are:
2, 6 dichlorophenol; 2, 4, 6 trimethyl phenol; 2, 6 dimethyl-4-ethyl phenol; and 2, 6 dimethyl-4-tert-butyl phenol.

The invention is illustrated by the following examples:

EXAMPLE 1

The apparatus used in all of the examples is conventional laboratory equipment for carrying out the process for coating a substrate with parylene as described above in the beginning of the specification. There is a vaporizer section, a pyrolysis zone, and a deposition chamber, all connected by tubing, with the deposition chamber having a valved outlet connected to a pump for providing the required vacuum. Connected to the tubing located between the pyrolysis zone and the deposition chamber is another piece of valved tubing leading to a flask in which the phenol is vaporized and then leaked into the main tube to meet the vaporous diradical and the mixture proceeds to the deposition chamber. Heating means for vaporization and pyrolysis are provided while condensation is effected by ambient temperature. Glass substrates are provided in the deposition chamber.

10 grams of 2, 6 di-tert-butyl-4 -methyl phenol are placed in the flask which is then evacuated to 10 microns. The leak valve is closed. 30 grams of dichlorodiparaxylylene are placed in the vaporizer section, the system is evacuated to 10 microns and the system heaters are energized. The phenol melts at 130° C. When parylene is detected in the deposition chamber (via mass spectrometry), the additive leak valve is opened. The deposition takes 83 minutes at the end of which the leak valve is closed, the heaters are turned off, and the system is bled up to atmospheric pressure. 2.1 grams of additive are used giving an induction period of 2 to 4 minutes as measured by isothermal DSC analysis (described below). The concentration of additive is 3.4 percent by weight based on the weight of the parylene as measured by the neutron activation technique described above.

In isothermal DSC analysis, two parylene specimens (one with additive and one without, each weighing about 0.50 miligram) are heated at 160° C. per minute to 220° C. under a nitrogen atmosphere. After waiting for 7 minutes for thermal equilibrium, the atmosphere is changed to air. The specimens are placed in an aluminum pan with aluminum screens on top of the specimens to ensure good mechanical control of the specimens in the pan. The time beginning when the air is turned on until the specimens begin to oxidize (an exothermic response relative to an empty reference pan) is defined as the induction period and is a measure of the thermal endurance of parylene films.

EXAMPLE 2

Example 1 is repeated except that 8 grams of 2, 6 dimethoxyphenol are placed in the flask; the flask and system are evacuated to 9 microns; 20 grams of dichlorodiparaxylylene are placed in the vaporizer section; th additive melts at 49° C.; and the deposition takes 65 minutes. All 8 grams of the additive are used and the induction period is 15.5 minutes. Additive concentration is 15.4 percent by weight.

EXAMPLE 3

Example 1 is repeated except that 10 milliliters of 2, 6 di-tert-butyl-4-n-butyl phenol are placed in the flask; 20 grams of dichlorodiparaxylylene are placed in the vaporizer; the deposition takes 100 minutes; 8 milliliters of the additive are used; the induction period is 15 minutes; and the additive concentration is 11.5 percent by weight.

EXAMPLE 4

Example 1 is repeated except that 10 grams of pyrogallol are placed in the flask; 20 grams of the dimer are placed in the vaporizer section; the additive sublimes at 240° C.; the deposition takes 65 minutes; all 10 grams of the additive are used; the induction period is 5 to 6 minutes; and the concentration is slightly less than 0.4 percent by weight.

EXAMPLE 5

Example 1 is repeated except that 10 grams of 1, 1, 3-tris (2-methyl-4-hydroxy-5-tert-butyl phenyl) butane are placed in the flask; 25 grams of dichlorodiparaxylylene are placed in the vaporizer section; 1.38 grams of the additive are used; the induction period is 14 to 16 minutes; and the concentration is 1.1 percent by weight.

Related subject matter may be found in the application of Gary S. Cieloszyk, Ser. No. 871,146, filed on the same date as the instant application, for "Parylene Stabilization".

I claim:
1. An article comprising:
    (a) a solid substrate; and
    (b) a coating on said substrate, said coating comprising parylene admixed with (i) a sterically hindered phenol vaporizable at a temperature in the range of about 20° C. to about 150° C. (ii) pyrogallol wherein the amount of phenol or pyrogallol admixed with the parylene is about 0.1 to about 15 percent by weight based on the weight of the parylene.
2. The article defined in claim 1 wherein the parylene is admixed with the hindered phenol.
3. The article defined in claim 2 wherein the phenol is 2, 6 dimethyl phenol; 2, 6-di-tert-butyl-4-methyl phenol; or 2, 6-di-tert-butyl-4-n-butyl-phenol.
4. The article defined in claim 2 wherein the hindered phenol is derived from 1, 1, 3-tris (2-methyl-4-hydroxy-5-tert-butyl-phenyl) butane.
5. The article defined in claim 1 wherein the parylene is admixed with pyrogallol.

* * * * *

UNITED STATES PATENT AND TRADEMARK OFFICE
CERTIFICATE OF CORRECTION

PATENT NO. : 4,163,828
DATED : August 7, 1979
INVENTOR(S) : Dennis M. Mahoney

It is certified that error appears in the above-identified patent and that said Letters Patent are hereby corrected as shown below:

Column 8, line 28, after "150°C.", insert -- or --.

Signed and Sealed this

Thirtieth Day of October 1979

[SEAL]

Attest:

RUTH C. MASON
Attesting Officer

LUTRELLE F. PARKER
Acting Commissioner of Patents and Trademarks